United States Patent
Kim et al.

(10) Patent No.: US 12,381,653 B2
(45) Date of Patent: Aug. 5, 2025

(54) METHOD AND APPARATUS FOR REPETITIVE SIGNAL TRANSMISSION IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Im Kim, Daejeon (KR); Jae Sheung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 17/949,067

(22) Filed: Sep. 20, 2022

(65) Prior Publication Data
US 2023/0163881 A1 May 25, 2023

(30) Foreign Application Priority Data
Nov. 19, 2021 (KR) .................. 10-2021-0160808

(51) Int. Cl.
| | |
|---|---|
| H04L 1/00 | (2006.01) |
| H04L 1/08 | (2006.01) |
| H04W 72/1268 | (2023.01) |
| H04W 72/23 | (2023.01) |
| H04W 74/00 | (2009.01) |

(52) U.S. Cl.
CPC ...................... H04L 1/08 (2013.01)

(58) Field of Classification Search
CPC ........ H04L 1/00; H04L 1/08; H04W 72/1268; H04W 72/23; H04W 74/00
See application file for complete search history.

(56) References Cited

U.S. PATENT DOCUMENTS

| | | | |
|---|---|---|---|
| 6,014,411 A | 1/2000 | Wang | |
| 9,860,030 B2 | 1/2018 | Papasakellariou | |
| 10,104,683 B2 | 10/2018 | Chen et al. | |
| 10,305,623 B2 | 5/2019 | Papasakellariou | |

(Continued)

FOREIGN PATENT DOCUMENTS

| | | |
|---|---|---|
| KR | 20200034508 A | 3/2020 |
| KR | 20210028111 A | 3/2021 |

OTHER PUBLICATIONS

Perez, L. et al., "A Distance Spectrum Interpretation of Turbo Codes", IEEE Transactions on Information Theory, vol. 42, No. 6, pp. 1698-1709, Nov. 1996.

(Continued)

*Primary Examiner* — Hassan A Phillips
*Assistant Examiner* — Prenell P Jones
(74) *Attorney, Agent, or Firm* — Rabin & Berdo, P.C.

(57) ABSTRACT

A repeated transmission method performed by a first communication node may comprise: repeatedly concatenating data to be transmitted to a second communication node by a preset first repetition number; performing channel coding on the concatenated data; generating first data having a resource unit size based on the channel-coded data; repeatedly outputting the first data by a preset second repetition number; and transmitting wireless signals generated according to the repeated output of the first data to the second communication node, wherein the first repetition number and the second repetition number are natural numbers.

15 Claims, 5 Drawing Sheets

(56) References Cited

U.S. PATENT DOCUMENTS

| | | | |
|---|---|---|---|
| 10,972,887 B2 | 4/2021 | Park et al. | |
| 11,411,672 B2 | 8/2022 | Ahn et al. | |
| 11,843,935 B2* | 12/2023 | You | H04L 5/0094 |
| 12,016,044 B2* | 6/2024 | Ma | H04L 1/08 |
| 12,149,385 B2* | 11/2024 | Chatterjee | H04L 5/0044 |
| 2016/0218788 A1* | 7/2016 | Yum | H04L 1/1812 |
| 2016/0269146 A1* | 9/2016 | Sun | H04L 1/0026 |
| 2019/0036644 A1 | 1/2019 | Wikström et al. | |
| 2019/0246378 A1* | 8/2019 | Islam | H04L 1/1819 |
| 2019/0305899 A1* | 10/2019 | Rico Alvarino | H04L 5/006 |
| 2020/0021403 A1* | 1/2020 | Zheng | H04L 1/08 |
| 2020/0162208 A1 | 5/2020 | Moon et al. | |
| 2020/0288446 A1 | 9/2020 | Lee | |
| 2021/0037554 A1 | 2/2021 | Kim et al. | |
| 2021/0058963 A1* | 2/2021 | Mu | H04W 74/004 |
| 2021/0083800 A1 | 3/2021 | Loghin | |
| 2021/0099260 A1* | 4/2021 | Guan | H04B 7/0695 |
| 2021/0167899 A1 | 6/2021 | Balasubramanian et al. | |
| 2021/0184812 A1* | 6/2021 | MolavianJazi | H04W 72/23 |
| 2021/0274556 A1* | 9/2021 | Park | H04L 1/0026 |
| 2021/0352689 A1 | 11/2021 | Jung et al. | |
| 2021/0392648 A1* | 12/2021 | Andersson | H04W 72/53 |
| 2022/0052779 A1* | 2/2022 | Ye | H04W 72/23 |
| 2022/0232639 A1* | 7/2022 | Wang | H04L 1/0003 |
| 2022/0295567 A1* | 9/2022 | Wei | H04W 74/0833 |
| 2022/0322443 A1* | 10/2022 | Kwak | H04W 74/0833 |
| 2023/0015843 A1* | 1/2023 | Li | H04W 74/0891 |
| 2023/0231623 A1* | 7/2023 | You | H04L 1/1819 370/316 |
| 2023/0239089 A1* | 7/2023 | Choi | H04L 5/0064 370/330 |
| 2024/0215015 A1* | 6/2024 | Su | H04W 72/569 |

OTHER PUBLICATIONS

Huawei, HiSilicon, "Sidelink resource allocation mode 2", Discussion and decision, R1-1900026, 3GPP TSG RAN WG1 Ad-Hoc Meeting 1901, Taipei, Jan. 21-25, 2019.

\* cited by examiner

METHOD AND APPARATUS FOR REPETITIVE SIGNAL TRANSMISSION IN WIRELESS COMMUNICATION SYSTEM

CROSS-REFERENCE TO RELATED APPLICATIONS

This application claims priority to Korean Patent Application No. 10-2021-0160808 filed on Nov. 19, 2021 with the Korean Intellectual Property Office (KIPO), the entire contents of which are hereby incorporated by reference.

BACKGROUND

1. Technical Field

The present disclosure relates to a repeated signal transmission technique in a wireless communication system, and more particularly, to a repeated signal transmission technique for efficiently performing signal transmission and repeated transmission between communication nodes constituting the wireless communication system.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

An exemplary embodiment of the communication system may support Internet of Things (IoT) technology. The IoT technology may refer to a technology for controlling various things by embedding sensors or communication functions in the various things, connecting the various things through wireless communication, and performing controls such as information acquisition or command transmission through them. The 3GPP Narrow Band Internet of Things (NB-IoT) technology may refer to a technology using a narrow bandwidth (e.g., 200 KHz, etc.) among IoT technologies. The NB-IoT technology may aim to periodically perform operations such as measurement, reporting, and control without replacing a battery for a long period of time. The NB-IoT technology may aim to improve transmission techniques of terminals and reduce production costs of terminals so that a battery life of each terminal is prolonged and multiple terminals can be connected per unit area. In the communication system to which the NB-IoT technology is applied, techniques that minimize battery consumption while overcoming data errors through repeated transmission in a narrow band, or the like even in a situation of a poor communication environment may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a repeated signal transmission method and apparatus for lowering a retransmission occurrence probability in an error floor region of a turbo code by efficiently performing signal transmission and repeated transmission between communication nodes constituting a wireless communication system.

A repeated transmission method performed by a first communication node in a communication system, according to an exemplary embodiment of the present disclosure for achieving the above-described objective, may comprise: repeatedly concatenating data to be transmitted to a second communication node of the communication system by a preset first repetition number, the data being included in a first transport block (TB); performing channel coding on the concatenated data; generating first data having a resource unit size based on the channel-coded data; repeatedly outputting the first data by a preset second repetition number; and transmitting wireless signals generated according to the repeated output of the first data to the second communication node, wherein the first repetition number and the second repetition number are natural numbers.

The repeated transmission method may further comprise, before the concatenating, determining the first repetition number and the second repetition number based on repetition number information received from the second communication node.

The first communication node may be a terminal, the second communication node may be a base station, and the determining may comprise: receiving, from the second communication node, system information; transmitting, to the second communication node, a message 1 (Msg1); receiving, from the second communication node, a message 2 (Msg2); transmitting, to the second communication node, a message 3 (Msg3) based on information on a repetition number set received from the second communication node; and receiving, from the second communication node, a first downlink signal including the repetition number information including information on the first repetition number and the second repetition number determined by the second communication node based on the transmitted Msg3, wherein the information on the repetition number set includes information on a first repetition number indication set and information on a second repetition number indication set, and is received from the second communication node through the system information or the Msg2.

The transmitting of the Msg3 may comprise: generating repeated data based on the information on the repetition number set; generating the Msg3 based on the repeated data; and transmitting the generated Msg3.

The determining may comprise: receiving, from the second communication node, a second downlink signal indicating data transmission of the first communication node to the second communication node; identifying information on a repetition indicator included in the second downlink signal; and identifying the first repetition number and the second repetition number indicated by the repetition number information, based on the information of the repetition indicator, wherein the repetition number information includes a mapping table between the repetition indicator, a reference length, the first repetition number, and the second repetition number.

The identifying of the first repetition number and the second repetition number may comprise: comparing a length of the first TB with the reference length; identifying the first repetition number from the mapping table based on a comparison result according to the comparing; and identifying the second repetition number mapped to the first repetition number from the mapping table.

A repeated transmission method performed by a first communication node in a communication system, according to an exemplary embodiment of the present disclosure for achieving the above-described objective, may comprise: determining repetition number information including information on a first repetition number and a second repetition number for a second communication node of the communication system, based on a system access procedure of the second communication node for the first communication node; transmitting the repetition number information to the second communication node; receiving, from the second communication node, wireless signals repeatedly transmitted based on first data and the repetition number information; and based on the repetition number information, restoring the first data by restoring data repeated by the second repetition number from the wireless signals repeatedly transmitted from the second communication node and then restoring data repeated by the first repetition number.

The determining of the repetition number information may comprise selecting the first repetition number and the second repetition number based on the repetition number information transmitted to the second communication node.

The first communication node may be a base station, the second communication node may be a terminal, and the selecting may comprise: transmitting, to the second communication node, system information; receiving, from the second communication node, a message 1 (Msg1); transmitting, to the second communication node, a message 2 (Msg2); receiving, from the second communication node, a message 3 (Msg3) transmitted based on information on a repetition number set transmitted to the second communication node; determining the repetition number information for the first communication node based on the transmitted Msg3; and transmitting a first downlink signal including the repetition number information to the second communication node, wherein the information on the repetition number set includes information on a first repetition number indication set and information on a second repetition number indication set, and is transmitted to the second communication node through the system information or the Msg2.

The receiving of the Msg3 may comprise obtaining repeated data generated by the second communication node based on the information on the repetition number set, the repeated data being included in the Msg3.

The selecting of the first repetition number and the second repetition number may comprise: transmitting, to the second communication node, a second downlink signal indicating data transmission from the second communication node to the first communication node; identifying information on a repetition indicator included in the second downlink signal; and identifying the first repetition number and the second repetition number indicated by the repetition number information, based on the information on the repetition indicator, wherein the repetition number information includes a mapping table between the repetition indicator, a reference length, the first repetition number, and the second repetition number.

A first communication node performing repeated transmission in a communication system, according to an exemplary embodiment of the present disclosure for achieving the above-described objective, may comprise: a processor; a memory electronically communicating with the processor; and instructions stored in the memory, wherein when executed by the processor, the instructions may cause the first communication node to: repeatedly concatenate data to be transmitted to a second communication node of the communication system by a preset first repetition number, the data being included in a first transport block (TB); perform channel coding on the concatenated data; generate first data having a resource unit size based on the channel-coded data; repeatedly output the first data by a preset second repetition number; and transmit wireless signals generated according to the repeated output of the first data to the second communication node, wherein the first repetition number and the second repetition number are natural numbers.

The instructions may further cause the first communication node to, before the concatenating, determine the first repetition number and the second repetition number based on repetition number information received from the second communication node.

The first communication node may be a terminal, the second communication node may be a base station, and the instructions may further cause the first communication node to: receive, from the second communication node, system information; transmit, to the second communication node, a message 1 (Msg1); receive, from the second communication node, a message 2 (Msg2); transmit, to the second communication node, a message 3 (Msg3) based on information on a repetition number set received from the second communication node; and receive, from the second communication node, a first downlink signal including the repetition number information including information on the first repetition number and the second repetition number determined by the second communication node based on the transmitted Msg3, wherein the information on the repetition number set includes information on a first repetition number indication set and information on a second repetition number indication set, and is received from the second communication node through the system information or the Msg2.

The instructions may further cause the first communication node to: receive, from the second communication node, a second downlink signal indicating data transmission of the first communication node to the second communication node; identify information on a repetition indicator included in the second downlink signal; and identify the first repetition number and the second repetition number indicated by the repetition number information, based on the information of the repetition indicator, wherein the repetition number information includes a mapping table between the repetition indicator, a reference length, the first repetition number, and the second repetition number.

According to an exemplary embodiment of the present disclosure, the communication node may perform a first repetition operation and a second repetition operation separately in repeatedly transmitting a signal. Accordingly, the communication node can obtain a channel coding gain through the repeated transmission, minimize power consumption by lowering a probability of occurrence of retransmission, and obtain a time diversity gain.

According to an exemplary embodiment of the present disclosure, repetition number information may be determined based on messages transmitted and received by the terminal and the base station in a random access channel (RACH) procedure. The terminal and the base station may perform repeated data transmission/reception operations based on the repetition number information determined based on the RACH procedure or the like.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

Figure 1:
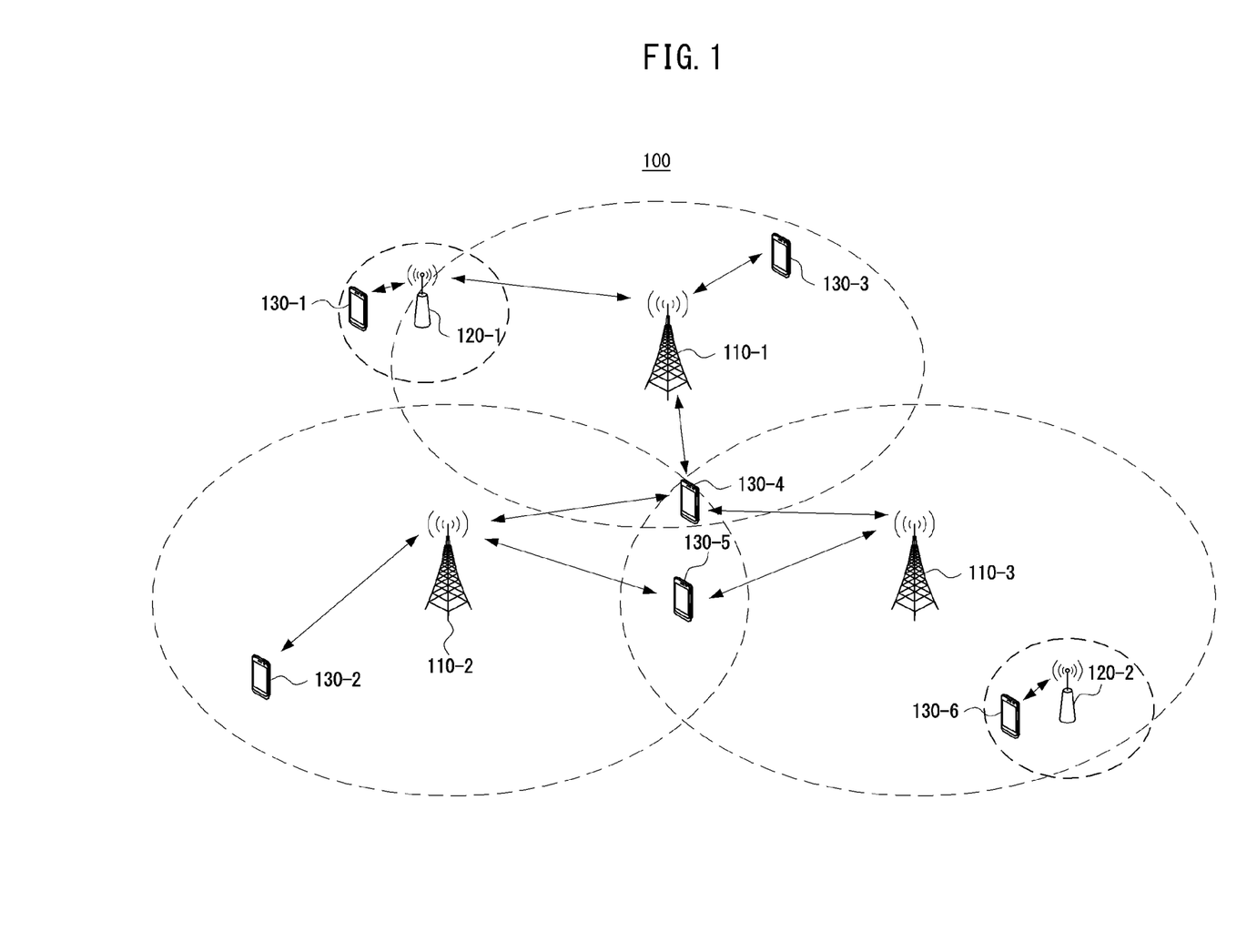
FIG. 1 is a conceptual diagram illustrating an exemplary embodiment of a communication system.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
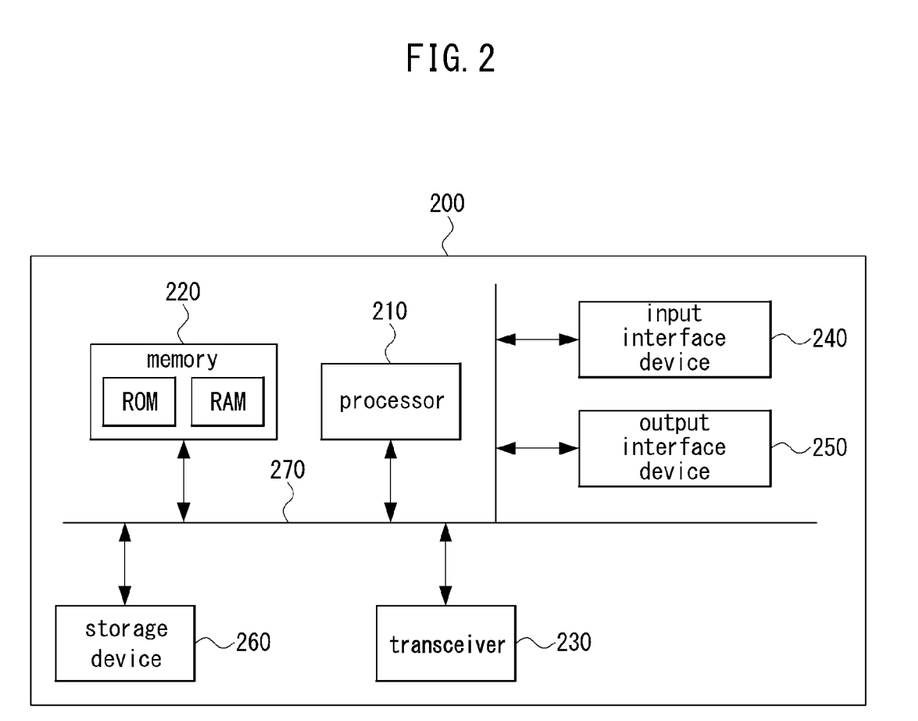
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner.

Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, repeated signal transmission methods in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
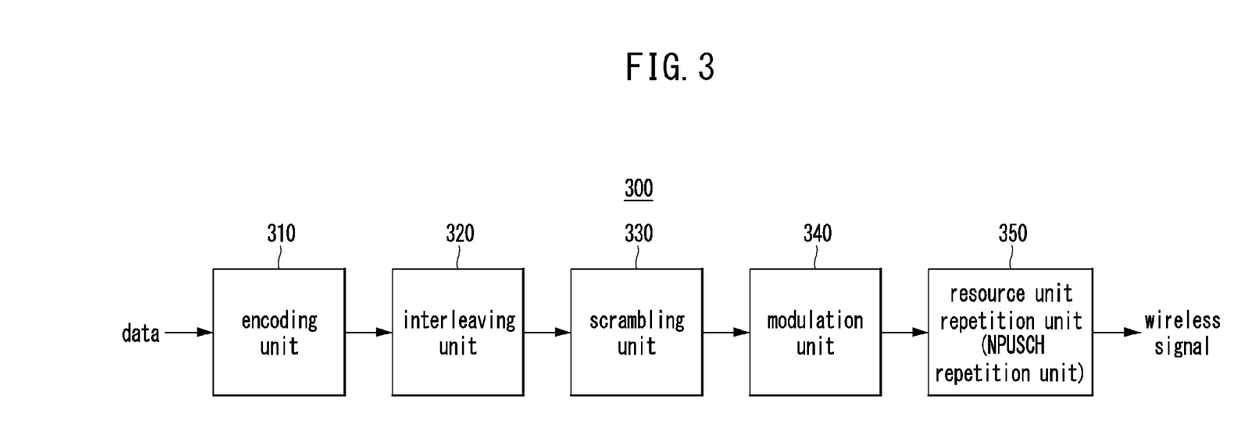
FIG. 3 is a block diagram for describing a first exemplary embodiment of a communication node that performs repeated transmission.

FIG. 3 is a block diagram for describing a first exemplary embodiment of a communication node that performs repeated transmission.

Referring to FIG. 3, a communication node of a communication system may include a transmitter 300 for transmitting signals. Here, the communication node may be configured identically or similarly to the communication nodes 110-1, 110-2, 110-3, 120-1, 120-2, 130-1, 130-2, 130-3, 130-4, 130-5, and 130-6 described with reference to FIG. 1 and the communication node 200 described with reference to FIG. 2. The communication node may be an Internet of Things (IoT) terminal or a Narrowband Internet of Things (NB-IoT) terminal. The transmitter 300 included in the communication node may include an encoding unit 310, an interleaving unit 320, a scrambling unit 330, a modulation unit 340, a resource unit repetition unit 350, and the like. Here, the resource unit repetition unit 350 may be referred to as a 'narrowband physical uplink shared channel (NPUSCH) repetition unit'.

The respective units included in the transmitter 300 shown in FIG. 3 may be logical entities or physical entities operating in a physical layer of the communication node. Although it has been described in FIG. 3 that operations of the respective units are sequentially connected, this is merely an example for convenience of description and exemplary embodiments of the present disclosure are not limited thereto. For example, in an exemplary embodiment of the transmitter 300, after an encoding operation in the encoding unit 310 is completed, an interleaving operation in the interleaving unit 320 may be performed, and thereafter, a scrambling operation in the scrambling unit 330 may be performed, and thereafter, a modulation operation in the modulation unit 340 may be performed, and thereafter, a repetition operation in the resource unit repetition unit 350 may be performed to generate and transmit a transmission signal. On the other hand, in another exemplary embodiment of the transmitter 300, the interleaving operation may be performed after the encoding operation, and after another type of encoding operation is performed, the modulation and transmission operations may be performed.

The communication node may transmit data to another communication node through the transmitter 300. Information that the communication node intends to transmit through the transmitter 300 may be referred to as a payload. The communication node may attempt to transmit data to another communication node by inputting the data to the transmitter 300. Meanwhile, when the communication node wants to transmit data through the transmitter 300, it may transmit the data by appending control information thereto. For example, when the communication node wants to transmit data through the transmitter 300, the communication node may transmit a preamble or a synchronization header (SHR) together by appending it to the data so that a receiving end can easily acquire synchronization and restore the payload.

The preamble or SHR may be used to synchronize a transmission timing between the transmitter 300 transmitting the signal and the receiving end receiving the same. In addition, the control information may include various structures such as a trailer.

The information that the communication node wants to transmit through the transmitter 300 may be input to the encoding unit 310 in form of a transport block (TB). The encoding unit 310 may perform Cyclical Redundancy Check (CRC) attachment. The encoding unit 310 may attach an error detection/correction code such as CRC bits to the data input in form of the TB. In the encoding unit 310, channel coding may be performed on each TB to which the error detection/correction code is attached. The channel coding may mean converting a signal so that a receiver can detect and correct errors occurring when the information is transmitted through a wireless channel. For example, in an exemplary embodiment of the communication system, the encoding unit 310 may encode the data using a turbo code scheme. However, this is merely an example for convenience of description, and exemplary embodiments of the present disclosure are not limited thereto. For example, the encoding unit 310 may perform the encoding operation based on a convolution code scheme, a polar code scheme, a differential coding scheme, a spread coding scheme, a spread-spectrum coding scheme, a Gold code scheme, an orthogonal variable spreading factor (OVSF) code scheme, and/or the like. Although a plurality of coding schemes have been described above, this is merely an example for convenience of description, and the coding scheme of the encoding unit 310 according to exemplary embodiments of the present disclosure is not limited thereto. The encoding unit 310 may perform encoding on data or codes through at least one of the aforementioned coding schemes or various other coding schemes.

The data encoded by the encoding unit 310 may be input to the interleaving unit 320. The interleaving unit 320 may perform an operation such as rate matching and interleaving on the coded data. Here, the rate matching may mean matching the size of the data to a predetermined resource unit reference size configured by the base station. Here, the resource unit reference size may mean a size of time and frequency resources of a NPUSCH, which are allocated for transmission once without repetition.

For example, when the length of the coded data is longer than a predetermined resource unit length configured by the base station, puncturing may be performed on the coded data. On the other hand, when the length of the coded data is shorter than the predetermined resource unit length, by adding a repetition of a specific bit to the coded data, it may be adjusted to be equal to the predetermined resource unit length. On the other hand, the interleaving may refer to an operation of dispersing in time or frequency so as not to be dense in time or frequency when a bit error occurs in a wireless channel environment where problems such as fading or burst error are easy to occur. The interleaving operation may be referred to as a 'channel interleaving' operation.

The data that has undergone the rate matching and/or interleaving in the interleaving unit 320 may be input to the scrambling unit 330. The data input from the interleaving unit 320 to the scrambling unit 330 may have the same size as the predetermined resource unit size configured by the base station. The scrambling unit 330 may perform a scrambling operation on the data input from the encoding unit 320. Here, the scrambling may refer to mixing signals so that a spectrum of a transmission signal is widely distributed. For example, the scrambling unit 340 may perform scrambling based on an XOR operation on the resource unit input from the interleaving unit 320 and a preset scrambling reference value.

The data that has undergone the scrambling in the scrambling unit 330 may be input to the modulation unit 340. The modulation unit 340 may perform a modulation operation on the data having the resource unit size input from the scrambling unit 330. The modulation unit 340 may perform the modulation operation to transmit the data of the resource unit through a wireless channel. In an exemplary embodiment, the modulation unit 340 may perform the modulation operation according to a Binary Phase Shift Keying (BPSK) scheme. In another exemplary embodiment, the modulation unit 340 may perform the modulation operation according to a Quadrature Amplitude Modulation (QAM) scheme. However, this is merely an example for description, and exemplary embodiments of the present disclosure are not limited thereto.

The data having the resource unit size, that has been modulated by the modulation unit 340, may be input to the resource unit repetition unit 350. The data input to the resource unit repetition unit 350 may be referred to as an 'input resource unit'. The resource unit repetition unit 350 may control the input resource unit to be transmitted repeatedly by a preset number of repeated transmissions. The resource unit repetition unit 350 may repeatedly output the input data having the resource unit size by a preset repetition number.

When the preset repetition number is a natural number m, in an exemplary embodiment of the communication system, the repetition number m may be set to one of {1, 2, 4, 8, 16, 32, 64, 128}. However, this is merely an example for convenience of description, and exemplary embodiments of the present disclosure are not limited thereto. When the communication node is a terminal accessing a base station, the repetition number m may be indicated by the base station. For example, the number n of TB repetitions may be indicated by a downlink control signal (e.g., downlink control information (DCI)) transmitted on a downlink control channel, system information block, radio resource control (RRC) message, Medium Access Control (MAC) control element (CE), and/or the like. Through the control on the repeated output by the resource unit repetition unit 350, services can be facilitated even in a narrow band, and a time diversity gain may be achieved. The data repeatedly output from the resource unit repetition unit 350 may be transmitted toward another communication node in form of wireless signals.

The transmitter 300 may include a structure for transmitting wireless signals. For example, the transmitter 300 may further include a structure such as transmit antenna(s) for transmitting wireless signals. In an exemplary embodiment, the communication node of the communication system may input data to the transmitter 300 to transmit the data to another communication node. The data input to the transmitter 300 may be transmitted in form of wireless signals through the antenna(s) after being converted into the wireless signals through the encoding unit 310, the interleaving unit 320, the scrambling unit 330, the modulation unit 340, the resource unit repetition unit 350, and the like. The transmitted wireless signals may be received at a receiver of another communication node or the like.

In an exemplary embodiment, the communication node may be a terminal according to the NB-IoT technology. The NB-IoT technology may refer to a technology using a narrow bandwidth (e.g., 200 KHz, etc.) among IoT technologies. The NB-IoT technology may aim to periodically perform operations such as measurement, reporting, and control without replacing a battery for a long period of time. For example, the NB-IoT technology may aim to perform periodical metering services such as water, gas, and electricity metering reports to a network without replacing batteries for more than 10 years, position tracking of objects such as children's bags/shoes, factory automation services, and the like. The NB-IoT technology may aim to easily provide services without replacing batteries for a long period of time even in a situation in which a wireless communication environment between a transmitter and a receiver is poor. For example, in the NB-IoT technology, smooth wireless communication may be required even in a situation in which a channel state, signal strength, or communication quality is poor compared to a terminal in the conventional LTE communication channel environment (e.g., a difference of 20 dB or more).

The NB-IoT technology may aim to improve transmission techniques of terminals and reduce production costs of terminals so that a battery life of each terminal is prolonged and multiple terminals can be connected per unit area. The NB-IoT technology may be characterized in that each of a plurality of terminals repeatedly transmits short-length data (i.e., small data) in order to overcome a data error and perform data transmission/reception smoothly even in a poor communication environment. The length of data transmitted by the terminal of the NB-IoT communication system may not be long enough to obtain a channel coding gain. Therefore, in an exemplary embodiment of the NB-IoT communication system, a terminal may be configured to repeatedly transmit uplink data in a resource unit size.

In an exemplary embodiment of the communication system supporting the NB-IoT technology, a base station may communicate with a terminal using an NB-IoT carrier. An uplink channel(s) and a downlink channel(s) may be configured within the NB-IoT carrier. The uplink channels for NB-IoT may include a narrowband physical random access channel (NPRACH), a narrowband physical uplink control channel (NPUCCH), a narrowband physical uplink shared channel (NPUSCH), and the like. The downlink channels for NB-IoT may include a narrowband physical broadcast channel (NPBCH), a narrowband physical downlink control channel (NPDCCH), a narrowband physical downlink shared channel (NPDSCH), and the like. In addition, a synchronization signal (e.g., a narrowband primary synchronization signal (NPSS), a narrowband secondary synchronization signal (NSSS)) or the like may be transmitted on a downlink channel for NB-IoT. The NPRACH, NPUCCH, NPUSCH, NPBCH, NPDCCH, and NPDSCH, which are physical channels of the communication system to which the NB-IoT technology is applied, may correspond to physical channels such as PRACH, PUCCH, PUSCH, PBCH, PDCCH and PDSCH, respectively. However, they may further include specific features added to provide IoT services in a narrow bandwidth. The NPRACH, NPUCCH, NPUSCH, NPBCH, NPDCCH, and NPDSCH mentioned in the present disclosure and their technical features may be identically or similarly applied to the corresponding PRACH, PUCCH, PUSCH, PBCH, PDCCH and PDSCH.

In the NB-IoT communication system, a physical channel on which the terminal transmits uplink data to the base station or the uplink data transmitted by the terminal to the base station may be referred to as an NPUSCH. In an exemplary embodiment of the NB-IoT communication system, coding of a turbo code scheme may be performed on the NPUSCH transmitted by the terminal to the base station. However, when turbo code encoding is performed on short-length data, there may be an error floor problem. Here, the error floor problem may mean a phenomenon in which an error is hardly overcome even when a signal-to-noise ratio (SNR) increases because a minimum distance value between encoded data is small. As the data length becomes shorter, the minimum distance value between encoded data on average may become smaller, and accordingly, an error floor probability may increase and thus an error overcoming probability may decrease. In the NB-IoT communication system, techniques that minimize battery consumption while smoothly transmitting and receiving data by overcoming problems such as the error floor problem and the poor communication situation may be required.

Figure 4:
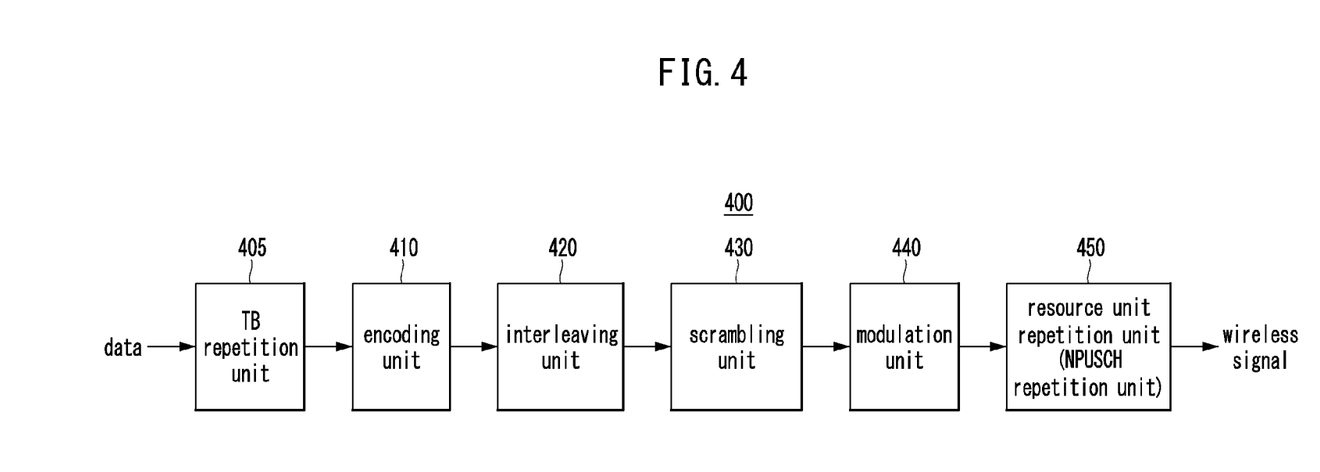
FIG. 4 is a block diagram for describing a second exemplary embodiment of a communication node that performs repeated transmission.

FIG. 4 is a block diagram for describing a second exemplary embodiment of a communication node that performs repeated transmission.

Referring to FIG. 4, a communication node may be configured identically or similarly to the communication node described with reference to FIG. 3. The communication node may be an IoT terminal or an NB-IoT terminal. A transmitter 400 included in the communication node may be configured identically or similarly to the transmitter 300 described with reference to FIG. 3. The transmitter 400 may include a TB repetition unit 405, encoding unit 410, interleaving unit 420, scrambling unit 430, modulation unit 440, resource unit repetition unit 450, and the like.

Here, among the respective units constituting the transmitter 400, the encoding unit 410, the interleaving unit 420, the scrambling unit 430, the modulation unit 440, the resource unit repetition unit 450, and the like may be configured identically or similarly to the encoding unit 310, the interleaving unit 320, the scrambling unit 330, the modulation unit 340, and the resource unit repetition unit 350 described with reference to FIG. 3. Hereinafter, in the description of the second exemplary embodiment of the communication node with reference to FIG. 4, content overlapping with those described with reference to FIGS. 1 to 3 may be omitted.

The communication node may transmit data to another communication node through the transmitter 400. Information that the communication node wants to transmit through the transmitter 400 may be input to the TB repetition unit 405 in form of a TB. The TB repetition unit 405 may generate repeated data by repeatedly concatenating the input TB by a preset number of TB repetitions. When the preset number of TB repetitions is a natural number n, in an exemplary embodiment of the communication system, the number n of TB repetitions may be set to one of {1, 2, 4, 8, 16, 32, 64, 128}. However, this is merely an example for convenience of description, and exemplary embodiments of the present disclosure are not limited thereto. When the communication node is a terminal accessing a base station, the number n of TB repetitions may be indicated by the base station. For example, the number n of TB repetitions may be indicated by a downlink control signal (e.g., DCI) transmitted on a downlink control channel, system information, RRC message, MAC CE, and/or the like. Alternatively, the number n of TB repetitions may be determined through a random access procedure or the like. Alternatively, the number n of TB repetitions may be determined based on the size of the TB to be transmitted.

When the size of the TB input to the TB repetition unit 405 is k bits, the size of a resource unit output from the TB repetition unit 405 may be (k×n) bits. For example, when the TB including k bits $\{d_1, d_2, \ldots, d_k\}$ is input and the preset number n of TB repetitions is 4, the TB repetition unit 405 may output repeated data including 4 k bits $\{d_1, d_2, \ldots, d_k, d_1, d_2, \ldots, d_k, d_1, d_2, \ldots, d_k, d_1, d_2, \ldots, d_k\}$ by repeating the bits included in the input TB four times.

The repeated data generated by the TB repetition unit 405 may be input to the encoding unit 410. The encoding unit 410 may attach a CRC to the input repeated data. The encoding unit 410 may perform channel coding on each resource unit to which the error detection/correction code such as CRC is attached. For example, in an exemplary embodiment of the communication system, the encoding unit 410 may encode each data using a turbo code scheme. However, this is merely an example for convenience of description, and exemplary embodiments of the present disclosure are not limited thereto. The repeated data encoded by the encoding unit 410 may be input to the interleaving unit 420. The interleaving unit 420 may perform an operation such as interleaving.

The data output from the interleaving unit 420 may be input to the scrambling unit 430. The scrambling unit 430 may perform a scrambling operation on the input data. The data that has undergone the scrambling in the scrambling unit 430 may be input to the modulation unit 440. In the modulation unit 440, a modulation operation may be performed.

The data input from the modulation unit 440 to the resource unit repetition unit 450 may have the same size as a predetermined resource unit size configured by the base station. The resource unit repetition unit 450 may control the input resource unit to be transmitted repeatedly by a preset number of repeated transmissions. The resource unit repetition unit 450 may repeatedly output the input resource unit by the preset number of repetitions. When the preset number of repeated transmissions is a natural number m, in an exemplary embodiment of the communication system, the number m of repeated transmissions may be set to one of {1, 2, 4, 8, 16, 32, 64, 128}. However, this is merely an example for convenience of description, and exemplary embodiments of the present disclosure are not limited thereto. When the communication node is a terminal accessing a base station, the number m of repeated transmissions may be indicated by the base station. For example, the number m of repeated transmissions may be indicated through DCI, system information, RRC message, MAC CE, and/or the like. Through the control on the repeated output by the resource unit repetition unit 450, services can be facilitated even in a narrow band, and a time diversity gain may be achieved.

The data repeatedly output from the resource unit repetition unit 430 may be transmitted toward another communication node in form of wireless signals. The transmitter 400 may include a structure for transmission of wireless signals. For example, the transmitter 400 may further include a structure such as transmit antenna(s) for transmitting the wireless signals.

Through control on TB repetitions in the TB repetition unit 405, the size of data encoded by the encoding unit 410 may be increased. Accordingly, a channel coding gain according to the encoding operation in the encoding unit 410 may be increased. Due to the control on the TB repetitions in the TB repetition unit 405, a minimum distance between data encoded by the encoding unit 410 may be increased. Accordingly, the error floor problem can be easily solved, and the error rate can be reduced or the error overcoming probability can be reduced. The control on TB repetitions in the TB repetition unit 405 may be referred to as a first-step repetition. The control on resource unit repetitions in the resource unit repetition unit may be referred to as a second-step repetition.

Figure 5:
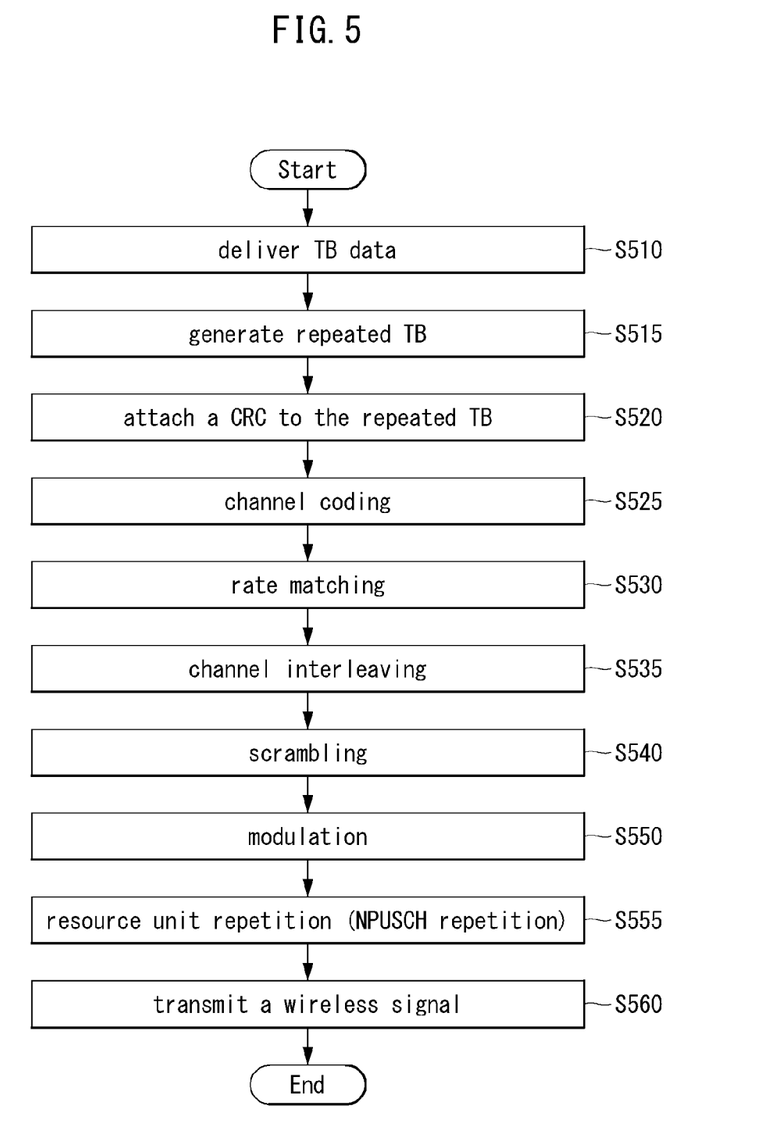
FIG. 5 is a flowchart for describing an exemplary embodiment of a repeated transmission method in a communication system.

FIG. 5 is a flowchart for describing an exemplary embodiment of a repeated transmission method in a communication system.

Referring to FIG. 5, when a communication node transmits a signal to another communication node, it may transmit in a repeated transmission scheme. Here, the communication node may be configured identically or similarly to the communication node described with reference to FIG. 4. The communication node may be an IoT terminal or an NB-IoT terminal. Hereinafter, in describing an exemplary embodiment of a repeated transmission method in a communication system with reference to FIG. 5, content overlapping with those described with reference to FIGS. 1 to 4 may be omitted.

The communication node of the communication system may transmit data to be transmitted to another communication node on a physical channel in form of a TB. The transmitting node may deliver the data to be transmitted from an upper layer (e.g., MAC layer) to a physical layer in form of a TB (S510). The communication node may perform a TB repetition operation on the TB delivered to the physical layer (S515). The TB repetition operation according to the step S515 may be the same as or similar to the operation of the TB repetition unit 405 described with reference to FIG. 4.

The communication node may perform CRC attachment to the data generated through the step S515 (S520). For example, CRC bits may be attached to the resource unit. The communication node may perform a physical layer channel coding operation on the data to which the CRC bits are attached (S525). The operations according to the steps S520 and S525 may be the same as or similar to those of the encoding unit 410 described with reference to FIG. 4.

The communication node may perform a rate matching operation on the data coded through the step S525 (S530). Through the rate matching operation, the size of the coded data may be matched to a predetermined resource unit reference size configured by the base station. The communication node may perform a channel interleaving operation on the data that has undergone the rate matching of the step S530 (S535). The operations according to the steps S530 and S535 may be the same as or similar to those of the interleaving unit 420 described with reference to FIG. 4.

The communication node may perform scrambling on the data having the resource unit size that has undergone the rate matching of the step S530 and the interleaving of the step S535 (S540). The operation in the step S540 may be the same as or similar to the operation of the scrambling unit 430 described with reference to FIG. 4.

The size of the data that has undergone the rate matching and the interleaving may have a size corresponding to or mapped to the predetermined resource unit size configured by the base station. The communication node may perform a modulation operation on the data having the resource unit size that has undergone the scrambling of the step S540 (S545). The operation in the step S545 may be the same as or similar to the operation of the modulation unit 440 described with reference to FIG. 4.

The communication node may control the resource units or data having the size corresponding to the resource unit size configured by the base station to be repeatedly output by a preset number m of repeated transmissions (S550). The operation according to the step S550 may be the same as or similar to the operation of the resource unit repetition unit 450 described with reference to FIG. 4. Wireless signals may be generated through the modulation operation according to the step S550. The communication node may transmit the generated wireless signals to another communication node (S560).

The TB repetition operation according to the step S515 may be referred to as a first-step repetition operation. The resource unit repetition operation according to the step S550 may be referred to as a second-step repetition operation. The number n of TB repetitions in the first-step repetition operation may be referred to as a first-step repetition number n. The number m of repeated transmissions in the second-step repetition operation may be referred to as a second step repetition number m. The first-step repetition number n and the second-step repetition number m may be indicated by the base station through a downlink control channel, respectively. Alternatively, the first-step repetition number n and the second-step repetition number m may be determined based on a random access procedure or the like. Alternatively, the first-step repetition number n and the second-step repetition number m may be determined based on the size of the TB to be transmitted by the communication node.

Figure 6:
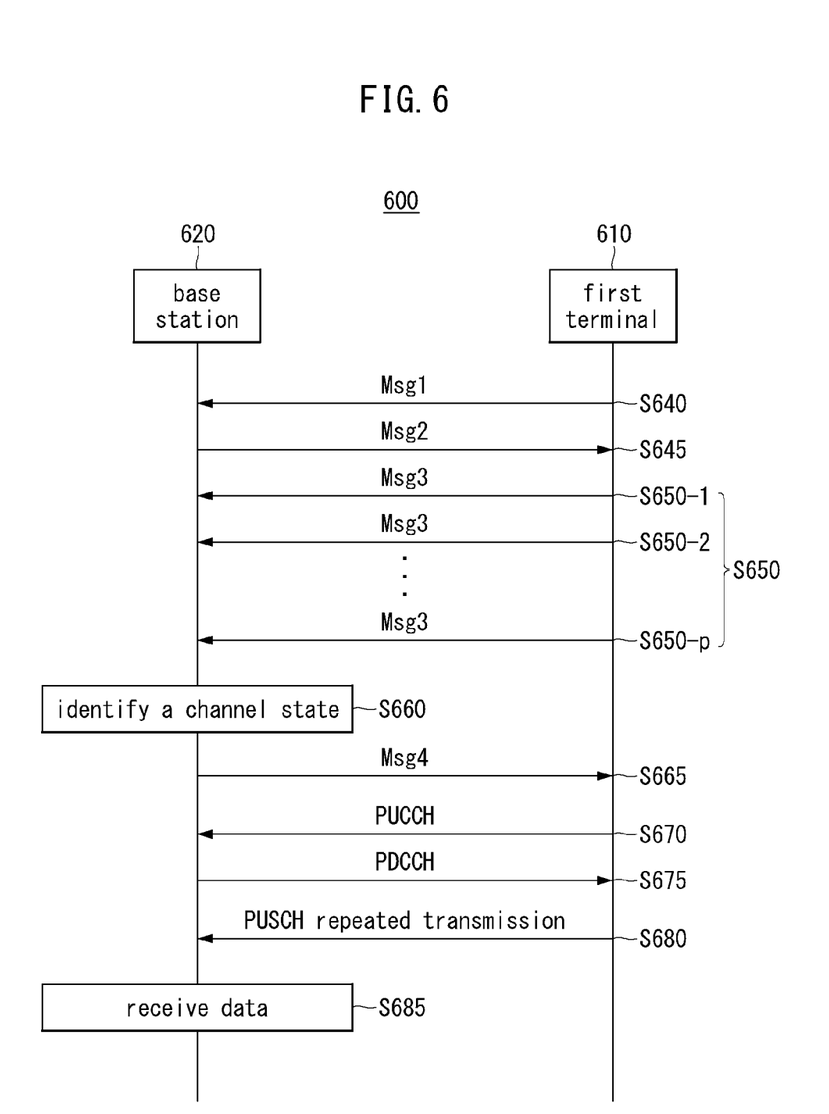
FIG. 6 is a sequence chart illustrating an exemplary embodiment of a method for determining the number of repetitions in a communication system.

FIG. 6 is a sequence chart illustrating an exemplary embodiment of a method for determining the number of repetitions in a communication system.

Referring to FIG. 6, a communication system 600 may include one or more base stations (BSs) and one or more terminals (i.e., user equipments (UEs)). In FIG. 6, it can be seen that the communication system including one base station and one terminal is illustrated as an example. However, this is merely an example for convenience of description, and exemplary embodiments of the present disclosure are not limited thereto. For example, the communication system 600 may be configured to include a plurality of base stations and/or a plurality of terminals.

The communication system 600 may include a first terminal 610 and a base station 620 to which the first terminal accesses. Here, the first terminal 610 may be the same as or similar to the communication node described with reference to FIG. 4 or the communication node described with reference to FIG. 5. The first terminal 610 may be an IoT terminal or an NB-IoT terminal. The base station 620 may be a base station supporting IoT services or NB-IoT services. Hereinafter, in describing an exemplary embodiment of a method for determining the number of repetitions in the communication system with reference to FIG. 6, content overlapping with those described with reference to FIGS. 1 to 5 may be omitted.

The first terminal 610 may perform a random access channel (RACH) procedure for accessing the base station 620. The RACH procedure may refer to a procedure in which the first terminal 610 and the base station 620 mutually transmit and receive a plurality of RACH messages in order for the first terminal 610 and the base station 620 to secure mutual timing synchronization or for the first terminal 610 to be connected to the base station 620. The RACH procedure may be performed in situations such as initial access, RRC reconfiguration, handover, and the like. The RACH procedure may consist of four steps (4-step) or two steps (2-step). It can be seen that FIG. 6 shows an exemplary embodiment in which the first terminal 610 performs a 4-step RACH procedure. However, this is merely an example for convenience of description and exemplary embodiments of the present disclosure are not limited thereto.

The base station 620 may transmit system information to the first terminal 610. The first terminal 610 may receive the system information from the base station 620. The first terminal 610 may transmit a message 1 (Msg1) to the base station 620 according to the 4-step RACH procedure (S640). The base station 620 may receive the Msg1 from the first terminal 610 (S640). Upon receiving the Msg1 from the first terminal 610, the base station 620 may transmit a message 2 (Msg2) to the first terminal 610 according to the 4-step RACH procedure (S645). The first terminal 610 may receive the Msg2 transmitted from the base station 620 (S645).

Upon receiving the Msg2 from the base station 620, the first terminal 610 may transmit a message 3 (Msg3) to the base station 620 according to the 4-step RACH procedure (S650). Here, the first terminal 610 may repeatedly transmit the Msg3 p times based on a preset number n of repeated Msg3 transmissions (S650-1, S650-2, ... , S650-p). When the first terminal 610 repeatedly transmits the Msg3 p times, the first-step repetition number n and the second-step repetition number m described with reference to FIG. 5 may be changed and applied every time based on a predetermined repetition number indication set. For example, when the preset number p of repeated Msg3 transmissions is 4, the first terminal 610 may repeatedly transmit the Msg3 to the base station 620 four times, and the first-step repetition number n and the second-step repetition number m maybe applied as the same values or different values for every repeated transmission cycle. The first-step repetition number n applied for each repetition transmission cycle may be determined based on a first repetition number indication set for the first-step repetition number n. The second-step repetition number m applied for each repetition transmission cycle may be determined based on a second repetition number indication set for the second-step repetition number m. The first repetition number indication set, the second repetition number indication set, and the number p of repeated Msg3 transmissions may be previously agreed or set between the first terminal 610 and the base station 620. For example, the first terminal 610 may obtain information on the first repetition number indication set, the second repetition number indication set, and the number p of repeated Msg3 transmissions through the Msg2, downlink control information (DCI), system information, RRC message, MAC CE, and/or the like transmitted by the base station 620. For example, when the first and second repetition number indication sets of the same values are allocated to all terminals in the cell, the base station 620 may transmit information of the first and second repetition number indication sets to the respective terminals through the system information. On the other hand, when the first and second repetition number indication sets of different values are allocated to the respective terminals in the cell, the base station 620 may transmit information of the first and second repetition number indication sets to the respective terminals using the Msg2.

When the first repetition number indication set for the first-step repetition number n is {1, 2, 2, 4}, and the second repetition number indication set for the second-step repetition number m is {2, 2, 4, 4}, the first terminal 610 may perform the repeated Msg3 transmission operation in the manner shown in Table 1.

TABLE 1

| Msg3 transmission cycle | First-step repetition number n | Second-step repetition number m |
|---|---|---|
| 1 | 1 | 2 |
| 2 | 2 | 2 |
| 3 | 2 | 4 |
| 4 | 4 | 4 |

That is, when transmitting the Msg3 for the first time (S650-1), the first terminal 610 may generate a first resource unit based on a first TB corresponding to contents of the Msg3. The first resource unit may be regarded as the same as the first TB. The first terminal 610 may control the first resource unit generated based on the first TB to be modulated into wireless signals and repeatedly transmitted twice. The base station 620 may receive the wireless signals repeatedly transmitted twice based on the first resource unit generated with a size of one first TB corresponding to the Msg3 contents (S650-1).

When transmitting the Msg3 for the second time (S650-2), the first terminal 610 may generate a first resource unit configured to repeat bits of the first TB corresponding to the contents of the Msg3 twice. The size of the first resource unit may be twice the size of the first TB. The first terminal 610 may control the generated first resource unit to be modulated into wireless signals and repeatedly transmitted twice. The base station 620 may receive the wireless signals repeatedly transmitted twice based on the first resource unit generated with a size of two first TBs corresponding to the Msg3 contents (S650-2).

When transmitting the Msg3 for the third time (S650-3), the first terminal 610 may generate a first resource unit configured to repeat the bits of the first TB corresponding to the contents of Msg3 twice. The size of the first resource unit may be twice the size of the first TB. The first terminal 610 may control the generated first resource unit to be modulated into wireless signals and repeatedly transmitted four times. The base station 620 may receive the wireless signals repeatedly transmitted four times based on the first resource unit generated with a size of two first TBs corresponding to the Msg3 contents (S650-3).

When transmitting the Msg3 for the fourth time (S650-4), the first terminal 610 may generate a first resource unit configured to repeat the bits of the first TB corresponding to the Msg3 content four times. The size of the first resource unit may be four times the size of the first TB. The first terminal 610 may control the generated first resource unit to be modulated into wireless signals and repeatedly transmitted four times. The base station 620 may receive the wireless signals repeatedly transmitted four times based on the first resource unit generated with a size of four first TBs corresponding to the Msg3 content (S650-4).

The base station 620 may identify the contents of the Msg3 that the first terminal 610 intends to transmit based on the Msg3 repeatedly received through the step S650. The base station 620 may identify a channel state between the first terminal 610 and the base station 620 based on the Msg3 repeatedly received through the step S650 (S660). The base station 620 may determine repetition number information including information on the optimal first-step repetition number n and the optimal second-step repetition number m for the first terminal 610 based on the information of the channel state identified through the step S660. The base station 620 may transmit the determined repetition number information for the first terminal 610 to the first terminal 610. For example, the base station 620 may transmit a message 4 (Msg4) that is a response to the Msg3 to the first terminal 610 (S665). Here, the base station 620 may include the repetition number information determined for the first terminal 610 in the Msg4 transmitted to the first terminal 610. Alternatively, after the initial access of the first terminal 610 is completed through the transmission of the Msg4, the first terminal 610 and the base station 620 may exchange the repetition number information through mutual transmission and reception of control signals.

In an exemplary embodiment of the communication system 600, the repetition number information may include a first mapping table determined as shown in Table 2.

TABLE 2

| Repetition indicator | Transport block length <L1 | | Transport block length ≥L1 | |
|---|---|---|---|---|
| | First-step repetition number n | Second-step repetition number m | First-step repetition number n | Second-step repetition number m |
| R1 | A1 | A2 | C1 | C2 |
| R2 | B1 | B2 | D1 | D2 |

The base station 620 may transmit the repetition number information including the first mapping table determined as shown in Table 2 to the first terminal 610. Whenever the first terminal 610 wants to transmit data, the base station 620 may transmit a repetition indicator R1 or R2 to the first terminal 610 to indicate the first-step repetition number n and the second-step repetition number m to be applied to the repeated transmission of the first terminal 610. Specifically, when the repetition indicator transmitted by the base station 620 to the terminal 610 is R1 and the length of a transport block that the terminal 610 wants to transmit to the base station 620 is less than a reference length L1, the first-step repetition number n and the second-step repetition number m may be set to A1 and A2, respectively. When the repetition indicator transmitted by the base station 620 to the terminal 610 is R1 and the length of a transport block that the terminal 610 wants to transmit to the base station 620 is equal to or greater than the reference length L1, the first-step repetition number n and the second-step repetition number m may be set to C1 and C2, respectively. When the repetition indicator transmitted by the base station 620 to the terminal 610 is R2 and the length of a transport block that the terminal 610 wants to transmit to the base station 620 is less than the reference length L1, the first-step repetition number n and the second-step repetition number m may be set to B1 and B2, respectively. When the repetition indicator transmitted by the base station 620 to the terminal 610 is R2 and the length of a transport block that the terminal 610 wants to transmit to the base station 620 is equal to or greater than the reference length L1, the first-step repetition number n and the second-step repetition number m may be set to D1 and D2, respectively. Each element constituting the first mapping table may be configured variously based on a communication environment of the communication system 600, the channel state between the base station 620 and the first terminal 610, channel states between the base station 620 and other terminals, and/or the like.

Before transmitting data to the base station 620, the first terminal 610 may transmit uplink control information (UCI) to the base station 620 on a PUCCH (S670). Upon receiving the UCI from the first terminal 610 (S670), the base station 620 may determine a repetition indicator R1 or R2 suitable for the corresponding time point. The base station 620 may transmit information on the determined repetition number R1 or R2 to the first terminal 610 on a PDCCH by including it in a DCI that corresponds to a response to the UCI received from the first terminal 610 (S675). Upon receiving the DCI from the base station 620 (S675), the first terminal 610 may identify resource allocation information and/or information on the repetition indicator included in the DCI. The first terminal 610 may repeatedly transmit a PUSCH to the base station 620 based on the indicated repetition number information and the repetition indicator information included in the DCI as shown in Table 2 (S680). For example, in an exemplary embodiment, when the repetition indicator transmitted by the base station 620 to the first terminal 610 is R1, and the length of the transport block of data that the first terminal 610 wants to transmit to the base station 620 is less than the reference length L1, the first terminal 610 may set the first-step repetition number n to A1 and set the second-step repetition number m to A2 to perform PUSCH transmission. The base station 620 may receive the data transmitted by the first terminal 610 by receiving the PUSCH repeatedly transmitted from the first terminal 610 (S685). The base station 620 may restore the resource unit by demodulating the PUSCH repeatedly received from the first terminal 610 based on the information of the second-step repetition number m. The base station 620 may restore the TB corresponding to the data transmitted by the first terminal 610 from the resource unit based on the information of the first-step repetition number n.

According to an exemplary embodiment of the present disclosure, the communication node may perform a first repetition operation and a second repetition operation separately in repeatedly transmitting a signal. Accordingly, the communication node can obtain a channel coding gain through the repeated transmission, minimize power consumption by lowering a probability of occurrence of retransmission, and obtain a time diversity gain.

According to an exemplary embodiment of the present disclosure, repetition number information may be determined based on messages transmitted and received by the terminal and the base station in a random access channel (RACH) procedure. The terminal and the base station may perform repeated data transmission/reception operations based on the repetition number information determined based on the RACH procedure or the like.

However, the effects that can be achieved by the signal transmission/reception method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A repeated transmission method performed by a first communication node in a communication system, the repeated transmission method comprising:
   repeatedly concatenating data to be transmitted to a second communication node of the communication system by a preset first repetition number, the data being included in a first transport block (TB);
   performing channel coding on the concatenated data;
   generating first data having a resource unit size based on the channel-coded data;
   repeatedly outputting the first data by a preset second repetition number; and
   transmitting wireless signals generated according to the repeated output of the first data to the second communication node,
   wherein the first repetition number and the second repetition number are natural numbers.

2. The repeated transmission method according to claim 1, further comprising, before the concatenating, determining the first repetition number and the second repetition number based on repetition number information received from the second communication node.

3. The repeated transmission method according to claim 2, wherein the first communication node is a terminal, the second communication node is a base station, and the determining comprises:
   receiving, from the second communication node, system information;
   transmitting, to the second communication node, a message 1 (Msg1);
   receiving, from the second communication node, a message 2 (Msg2);
   transmitting, to the second communication node, a message 3 (Msg3) based on information on a repetition number set received from the second communication node; and
   receiving, from the second communication node, a first downlink signal including the repetition number information including information on the first repetition number and the second repetition number determined by the second communication node based on the transmitted Msg3,
   wherein the information on the repetition number set includes information on a first repetition number indication set and information on a second repetition number indication set, and is received from the second communication node through the system information or the Msg2.

4. The repeated transmission method according to claim 3, wherein the transmitting of the Msg3 comprises:
   generating repeated data based on the information on the repetition number set;
   generating the Msg3 based on the repeated data; and
   transmitting the generated Msg3.

5. The repeated transmission method according to claim 2, wherein the determining comprises:
   receiving, from the second communication node, a second downlink signal indicating data transmission of the first communication node to the second communication node;
   identifying information on a repetition indicator included in the second downlink signal; and
   identifying the first repetition number and the second repetition number indicated by the repetition number information, based on the information of the repetition indicator,
   wherein the repetition number information includes a mapping table between the repetition indicator, a reference length, the first repetition number, and the second repetition number.

6. The repeated transmission method according to claim 5, wherein the identifying of the first repetition number and the second repetition number comprises:
   comparing a length of the first TB with the reference length;
   identifying the first repetition number from the mapping table based on a comparison result according to the comparing; and
   identifying the second repetition number mapped to the first repetition number from the mapping table.

7. A repeated reception method performed by a first communication node in a communication system, the repeated reception method comprising:

determining repetition number information including information on a first repetition number and a second repetition number for a second communication node of the communication system, based on a system access procedure of the second communication node for the first communication node;

transmitting the repetition number information to the second communication node;

receiving, from the second communication node, wireless signals repeatedly transmitted based on first data and the repetition number information; and based on the repetition number information, restoring the first data by restoring data repeated by the second repetition number from the wireless signals repeatedly transmitted from the second communication node and then restoring data repeated by the first repetition number.

8. The repeated reception method according to claim 7, wherein the determining of the repetition number information comprises selecting the first repetition number and the second repetition number based on the repetition number information transmitted to the second communication node.

9. The repeated reception method according to claim 8, wherein the first communication node is a base station, the second communication node is a terminal, and the selecting comprises:

transmitting, to the second communication node, system information;

receiving, from the second communication node, a message 1 (Msg1);

transmitting, to the second communication node, a message 2 (Msg2);

receiving, from the second communication node, a message 3 (Msg3) transmitted based on information on a repetition number set transmitted to the second communication node;

determining the repetition number information for the first communication node based on the transmitted Msg3; and transmitting a first downlink signal including the repetition number information to the second communication node, wherein the information on the repetition number set includes information on a first repetition number indication set and information on a second repetition number indication set, and is transmitted to the second communication node through the system information or the Msg2.

10. The repeated reception method according to claim 9, wherein the receiving of the Msg3 comprises obtaining repeated data generated by the second communication node based on the information on the repetition number set, the repeated data being included in the Msg3.

11. The repeated reception method according to claim 8, wherein the selecting of the first repetition number and the second repetition number comprises:

transmitting, to the second communication node, a second downlink signal indicating data transmission from the second communication node to the first communication node;

identifying information on a repetition indicator included in the second downlink signal; and identifying the first repetition number and the second repetition number indicated by the repetition number information, based on the information on the repetition indicator, wherein the repetition number information includes a mapping table between the repetition indicator, a reference length, the first repetition number, and the second repetition number.

12. A first communication node performing repeated transmission in a communication system, the first communication node comprising:

a processor;

a memory electronically communicating with the processor; and instructions stored in the memory, wherein when executed by the processor, the instructions cause the first communication node to:

repeatedly concatenate data to be transmitted to a second communication node of the communication system by a preset first repetition number, the data being included in a first transport block (TB);

perform channel coding on the concatenated data;

generate first data having a resource unit size based on the channel-coded data;

repeatedly output the first data by a preset second repetition number; and transmit wireless signals generated according to the repeated output of the first data to the second communication node, wherein the first repetition number and the second repetition number are natural numbers.

13. The first communication node according to claim 12, wherein the instructions further cause the first communication node to, before the concatenating, determine the first repetition number and the second repetition number based on repetition number information received from the second communication node.

14. The first communication node according to claim 13, wherein the first communication node is a terminal, the second communication node is a base station, and the instructions further cause the first communication node to:

receive, from the second communication node, system information;

transmit, to the second communication node, a message 1 (Msg1);

receive, from the second communication node, a message 2 (Msg2);

transmit, to the second communication node, a message 3 (Msg3) based on information on a repetition number set received from the second communication node; and receive, from the second communication node, a first downlink signal including the repetition number information including information on the first repetition number and the second repetition number determined by the second communication node based on the transmitted Msg3, wherein the information on the repetition number set includes information on a first repetition number indication set and information on a second repetition number indication set, and is received from the second communication node through the system information or the Msg2.

15. The first communication node according to claim 13, wherein the instructions further cause the first communication node to:

receive, from the second communication node, a second downlink signal indicating data transmission of the first communication node to the second communication node;

identify information on a repetition indicator included in the second downlink signal; and identify the first repetition number and the second repetition number indicated by the repetition number information, based on the information of the repetition indicator, wherein the repetition number information includes a mapping table between the repetition indicator, a reference length, the first repetition number, and the second repetition number.

\* \* \* \* \*